(12) United States Patent
Tsui et al.

(10) Patent No.: US 6,384,872 B1
(45) Date of Patent: May 7, 2002

(54) METHOD AND APPARATUS FOR INTERLACED IMAGE ENHANCEMENT

(75) Inventors: Ernest Tinyork Tsui, Cupertino; Mei Kuen Leong, Milpitas, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/395,000

(22) Filed: Sep. 13, 1999

(51) Int. Cl.$^7$ ................................................. H04N 5/21
(52) U.S. Cl. ....................... 348/625; 348/629; 348/630; 348/910; 348/619
(58) Field of Search ................................. 348/625, 618, 348/619, 623, 627, 628, 629, 630, 910, 446, 447; 382/254, 260, 261, 262, 266; H04N 5/21

(56) References Cited

U.S. PATENT DOCUMENTS

| | | | |
|---|---|---|---|
| 5,025,315 A | 6/1991 | Johary et al. | 358/140 |
| 5,136,385 A | 8/1992 | Campbell | 358/160 |
| 5,428,456 A | 6/1995 | Parulski et al. | 358/340 |
| 5,724,067 A | 3/1998 | Atchley et al. | 345/141 |
| 5,874,937 A | 2/1999 | Kesatoshi | 345/127 |
| 6,094,226 A | * 7/2000 | Ke | 348/446 |

* cited by examiner

Primary Examiner—Sherrie Hsia
(74) Attorney, Agent, or Firm—Thelen Reid & Priest LLP; John P. Schaub

(57) ABSTRACT

A method for image enhancement for an interlaced display includes receiving a first group of pixels aligned about an axis, detecting a second group of pixels within the first group of pixels, each pixel of the second group of pixels having a luminous disparity between adjacent pixels less than a first threshold, determining whether each pixel within the second group of pixels is part of a line or edge, the determination including a comparison of luma or chroma disparities between neighboring pixels and filtering each pixel determined to be part of a line or edge. An apparatus for image enhancement for an interlaced display includes an interface for receiving video data, a vertical filter coupled to the video data interface to detect inter-line correlation between pixels, a horizontal filter coupled to the output of the vertical filter to detect line correlation between pixels when inter-line correlation is detected and a flicker filter coupled to the output of the horizontal filter to filter pixels having horizontal correlation.

68 Claims, 12 Drawing Sheets

METHOD AND APPARATUS FOR INTERLACED IMAGE ENHANCEMENT

BACKGROUND OF THE INVENTION

1. Field of the Invention

The present invention relates to image processing. More particularly, the present invention relates to a method and apparatus for interlaced image enhancement.

2. Background

Because video resolution images are decimated versions of high resolution images, the video images can contain more detail than can be displayed using conventional TV display, reproduction signals for which typically originate with NTSC or PAL format video cameras. Typical high-resolution images can be expected to contain a much greater amount of vertical high spatial frequencies than conventional TV images. This additional vertical high spatial frequency content can cause a raster scan display artifact known as "interlace flicker", where the vertical edge details (from sharp horizontal lines, for example) will flicker visibly at a 30 Hz rate on normal interlaced NTSC displays. This interlace flicker occurs because the TV monitor displays every other line of the image during the first 1/60 second field time, and then displays the lines in between during the next 1/60 second field time, as shown in FIG. 1. In regions of an image having significant vertical detail, the lines of the first field will be quite different from the lines of the second field. This results in the observation of "movement" in the line or edge at the 30 Hz field rate. This perceived movement is called flicker. The amount of flicker in an image depends upon the image content and the way in which the image was created.

Interlace flicker can be reduced by lowpass filtering the image in the vertical direction, namely in a direction effectively transverse to the raster scan direction, thus reducing the vertical sharpness of the image. Generally, the higher the order of the filter the better the overall quality of the resultant image. Flicker filters of order 3 to 6 are typically used to mitigate the effects of flicker. Unfortunately, the filters also distort small font lettering such that the fonts become unreadable or nearly so. Moreover, higher order filters typically require significantly more hardware and memory bandwidth.

Turning again to FIG. 1, a block diagram that illustrates an interlaced display is presented. Odd lines 10, 12, 14 and 16 are written first, followed by even lines 18, 20 and 22. Without filtering, pixel 24 is output only when even line 20 is output, thus creating the appearance of flicker. Filtering the pixel values spreads the pixel across even and odd lines as represented by pixels 26–36. While this method reduces the appearance of flicker, it also creates a blurred image.

The effect of filtering on the readability of small font sizes is illustrated in FIGS. 2A to 3B. FIG. 2A is a block diagram that illustrates an unfiltered image of the character "g". For the purposes of illustration, the lines 40 comprising the character image are one pixel wide. FIG. 2B is a block diagram that illustrates the contrast levels present in the FIG. 2A image. Only two contrast levels are present in the image. One contrast level is used for the background and another contrast level is used for the lines comprising the character image. The small number of contrast levels and the difference between contrast levels provides a relatively clear image.

FIG. 3A is a block diagram that illustrates a filtered image of the character in FIG. 2A. As a result of filtering the character image, the image 42 now appears to be more than one character wide, having luma or chroma values between that of the background and that of the original character image. FIG. 3B is a block diagram that illustrates the contrast levels present in the filtered image of a character in FIG. 3A. As shown by FIG. 3B, there are many contrast levels in the filtered image 42. This smoothing of the character image results in a character that is more fuzzy and consequently less readable.

Further improvements are made possible by analyzing the high frequency content of an image and storing with the image a "flicker code" representative of the extent, if any, to which the vertical dimension of the image is to be subjected to a low pass filtering operation in the course of preparing the image for display. However, this method is not performed real-time. Furthermore, the flicker code typically applies to a whole image and thus fails to recognize that an image may be comprised of some regions that would benefit from filtering and other regions that would not benefit.

There is a trend in the computer field for brighter displays and increased resolution. For example, increasing numbers of computer applications such as e-mail and many Windows™-based applications use relatively small font sizes such as 10 point. Also, many Web pages have brightly colored bars and boxes to attract attention. Additionally, the popularity of High definition and large screen projection TVs continues to increase. Unfortunately, the perceived effects of flicker increase with increasing display brightness and with increasing display resolution.

Accordingly, a need exists in the prior art for a method and apparatus for image enhancement for interlaced displays that mitigates the effect of flicker in real-time and provides enhanced readability of relatively small fonts.

BRIEF DESCRIPTION OF THE INVENTION

A method for image enhancement for an interlaced display includes receiving a first group of pixels aligned about an axis, detecting a second group of pixels within the first group of pixels, each pixel of the second group of pixels having a luminous disparity between adjacent pixels less than a first threshold, determining whether each pixel within the second group of pixels is part of a line or edge, the determination including a comparison of luma or chroma disparities between neighboring pixels and filtering each pixel determined to be part of a line or edge. An apparatus for image enhancement for an interlaced display includes an interface for receiving video data, a vertical filter coupled to the video data interface to detect inter-line correlation between pixels, a horizontal filter coupled to the output of the vertical filter to detect line correlation between pixels when inter-line correlation is detected and a flicker filter coupled to the output of the horizontal filter to filter pixels having horizontal correlation.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to image processing. More particularly, the present invention relates to a method and apparatus for interlaced image enhancement. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

A horizontal correlation for a pixel of interest exists if the cumulative horizontal disparity of luma or chroma values of a group of pixels including the pixel of interest does not exceed a cumulative horizontal threshold. A vertical correlation for a pixel of interest exists if the cumulative vertical disparity of luma or chroma values of a group of pixels including the pixel of interest does not fall below a cumulative vertical threshold. According to the present invention, an image is filtered based on pixel horizontal correlation and pixel vertical correlation to reduce the effects of flicker while providing enhanced readability of small fonts.

Figure 1:
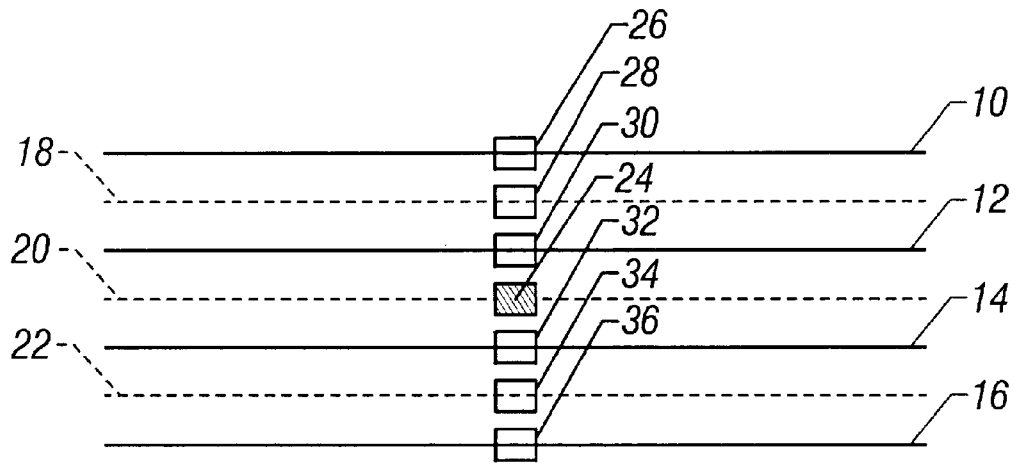
FIG. 1 is a block diagram that illustrates an interlaced display.
Figure 2A:
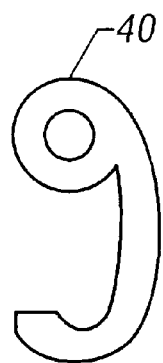
FIG. 2A is a block diagram that illustrates an unfiltered image of the character "g".
Figure 2B:
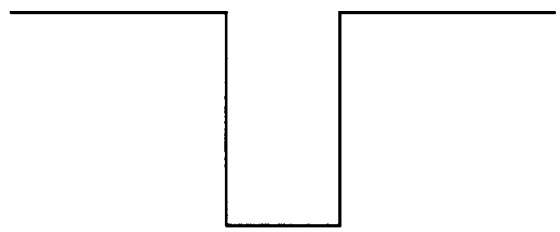
FIG. 2B is a block diagram that illustrates the contrast levels present in the unfiltered image represented by FIG. 2A.
Figure 3A:
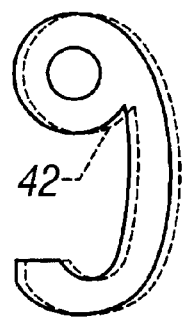
FIG. 3A is a block diagram that illustrates a filtered image of the character image represented by FIG. 2A.
Figure 3B:
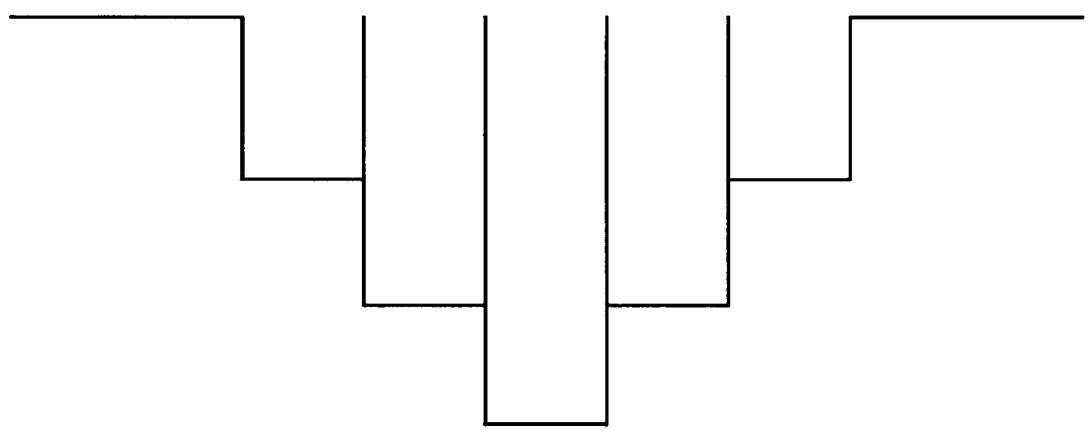
FIG. 3B is a block diagram that illustrates the contrast levels present in the filtered image represented by FIG. 3A.
Figure 4:
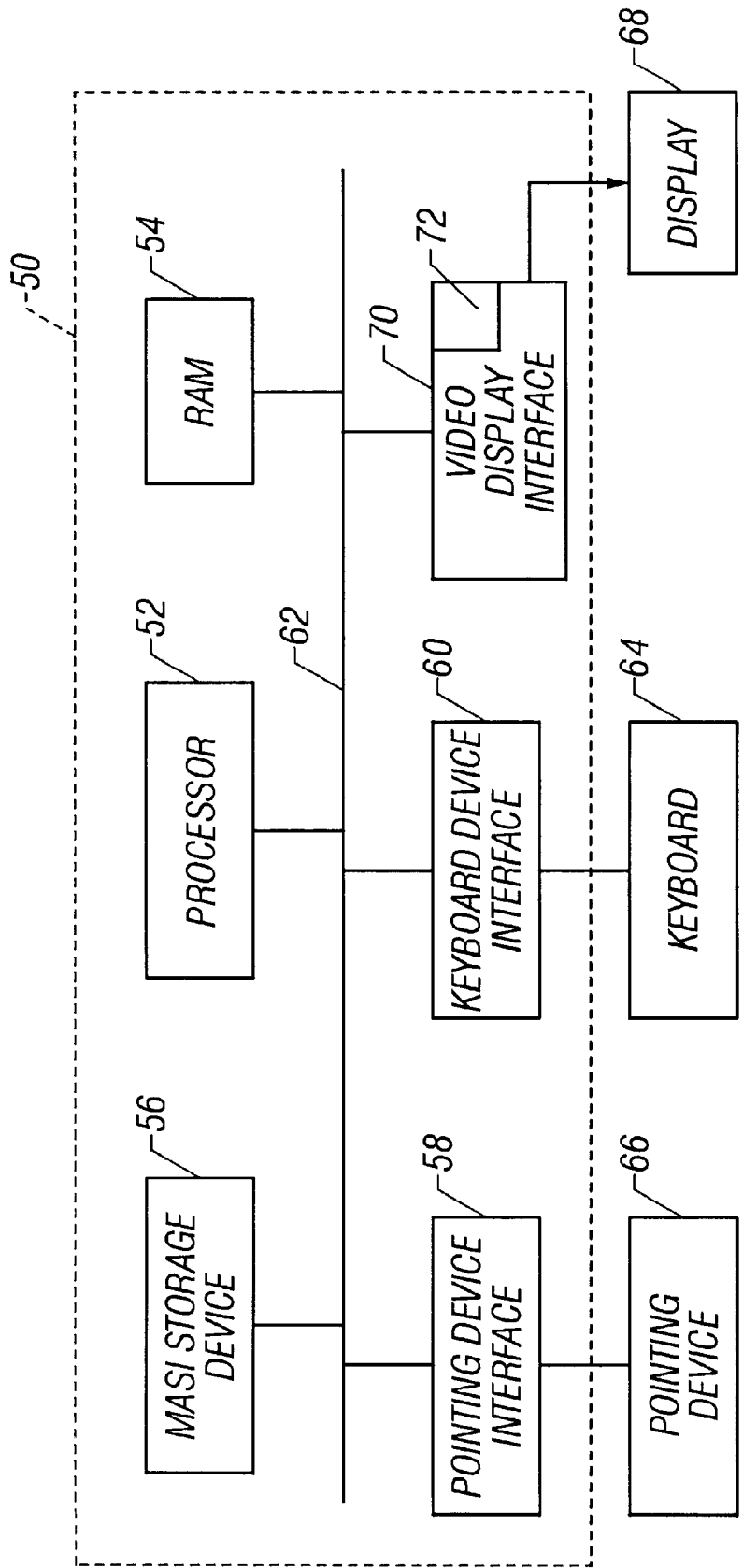
FIG. 4 is a block diagram illustrating a computer system in accordance with one embodiment of the present invention.

Turning now to FIG. 4, a block diagram showing a computer system according to one embodiment of the present invention is illustrated. The computer system comprises a core unit 50, including a first processor 52, a random access memory (RAM) 54, a mass storage device 56, a pointing device interface 58 and a keyboard device interface 60, all connected via a bus 62. A keyboard 64 is connected to the core unit 50 via the keyboard device interface 60. A pointing device 66 is connected to the core unit 50 via the pointing device interface 58. The core unit 50 is also connected to a display device 68 via a video display interface 70. The display device 68 may be, for example, a TV or computer monitor.

In operation, the first processor 52 processes program instructions stored in RAM 54 and mass storage device 56. The pointing device interface 58 and the keyboard device interface 60 allow manually entered data via the pointing device 58 and the keyboard 64, respectively. The video display interface 70 accepts digital video data from the first processor 52. The video display interface 70 contains a second processor 72. The video display interface 70 puts the digital video data in a format acceptable to the display device 68. This may include filtering the video data based on pixel horizontal correlation and pixel vertical correlation to enhance image quality by reducing the effects of flicker and providing improved readability of small fonts.

Figure 5:
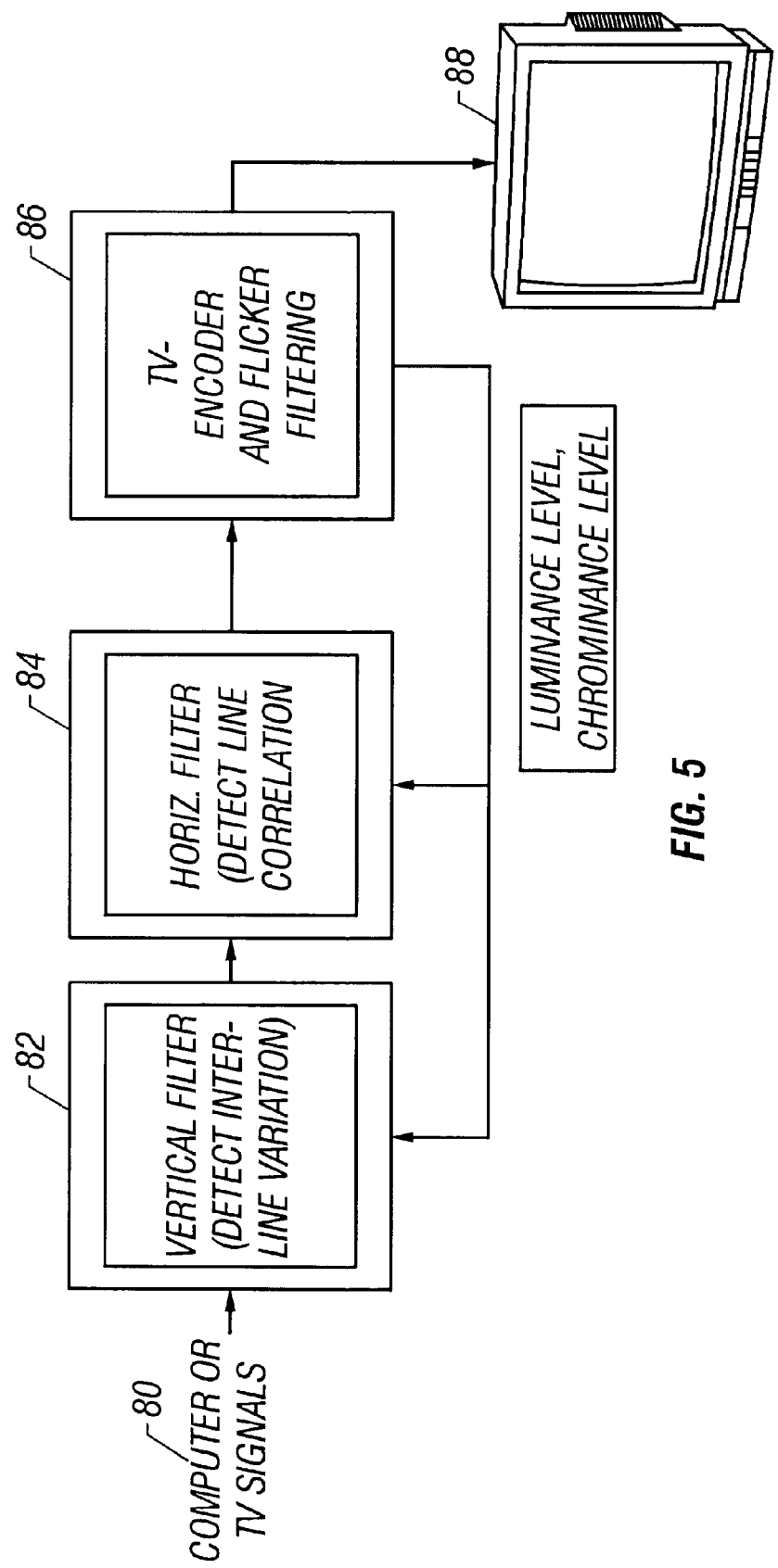
FIG. 5 is a block diagram of a video display interface in accordance with one embodiment of the present invention.

Turning now to FIG. 5, a block diagram of a video display interface 70 according to one embodiment of the present invention is presented. Computer or TV video signals 80 in the form of a scan line are input to a vertical filter 82. Each pixel has color component (chroma) and brightness (luma) values associated with it. The color spaces supported may be Red, Green, Blue (RGB) or YUV, for example. The vertical filter 82 detects pixel inter-line variation, or line-to background variation for each pixel in the scan line. When inter-line variation is detected, a vertical correlation is said to exist for the particular pixel.

The scan line and an indication of whether a vertical correlation exists for each pixel within the scan line are input to a horizontal filter 84. The horizontal filter 84 detects pixel line correlation for each pixel in the scan line. When pixel line correlation is detected, a horizontal correlation is said to exist for the particular pixel. A pixel is marked as a line or edge if both horizontal and vertical correlation exist for the pixel.

The unfiltered scan line and an indication of whether line or edge pixels exist are input to a flicker filter 86. The flicker filter 86 creates a filtered scan line. For every pixel in the scan line, a check is made to determine whether the pixel has been marked as a line or edge. If the pixel has been marked as a line or edge, the color component values to display for the pixel are obtained from the filtered line. Otherwise, the original color component values from the unfiltered scan line are used for display. The modified scan line containing a combination of filtered and unfiltered pixels is encoded by TV encoder 86 and output to a TV or computer monitor 88.

Figure 6:
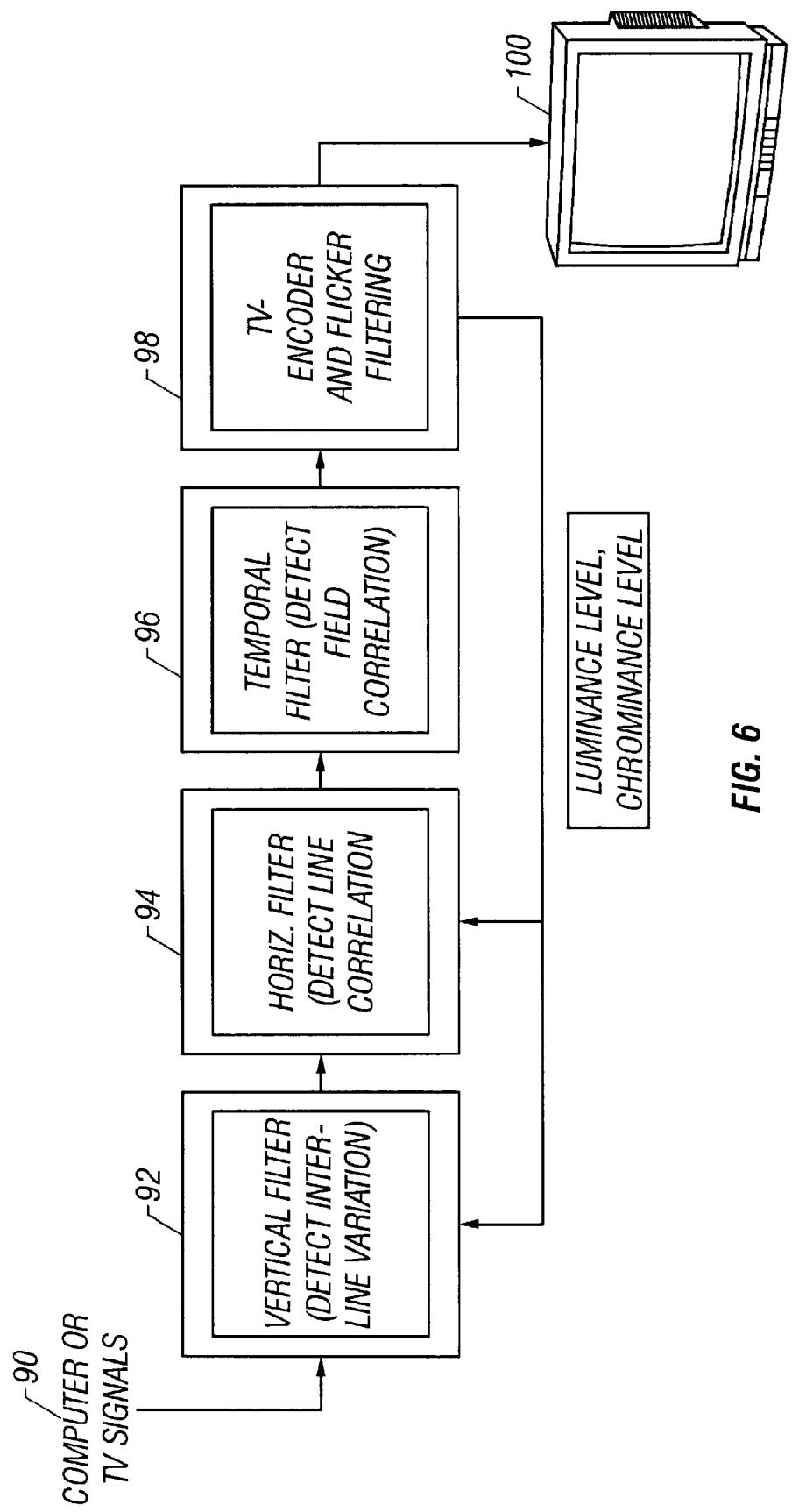
FIG. 6 is a block diagram of a video display interface in accordance with one embodiment of the present invention.

Turning now to FIG. 6, a block diagram of a video display interface 70 according to another embodiment of the present invention is presented. Similar to above, computer or TV video signals 90 in the form of a scan line are input to a vertical filter 92 and a horizontal filter 94. According to this embodiment, pixel values are filtered based upon whether a temporal correlation exists between frames, in addition to whether a vertical and horizontal correlation exist. The unfiltered scan line and an indication of whether a line/edge correlation exists are input to a temporal filter 96. The temporal filter 96 detects pixel field correlation, which is defined as whether the difference in luma or chroma values for the same pixel from different frames exceeds a temporal threshold. When field correlation is detected, temporal correlation is said to exist.

The unfiltered scan line and an indication of whether temporal correlation exists are input to a flicker filter 98. The flicker filter creates a filtered scan line. For every pixel in the scan line, a check is made to determine whether the pixel is marked as a line or edge. If so, the color component values to display for the pixel are obtained from the filtered line. Otherwise, the original color component values from the unfiltered scan line are used for display. The modified scan line containing a combination of filtered and unfiltered pixels is encoded by TV encoder 98 and output to a TV or computer monitor 100.

The description of the horizontal, vertical and temporal filters within a video display interface is not intended to be limiting in any way. Those of ordinary skill in the art will recognize that the first processor 52 may perform the horizontal 84, 94, vertical 82, 92 and temporal 96 filter processing as well. Additionally, other processors may share the filter processing in a computer system. Also, the order of the vertical filter 82, 92 and horizontal filter 84, 94 may be interchanged.

Figure 7:
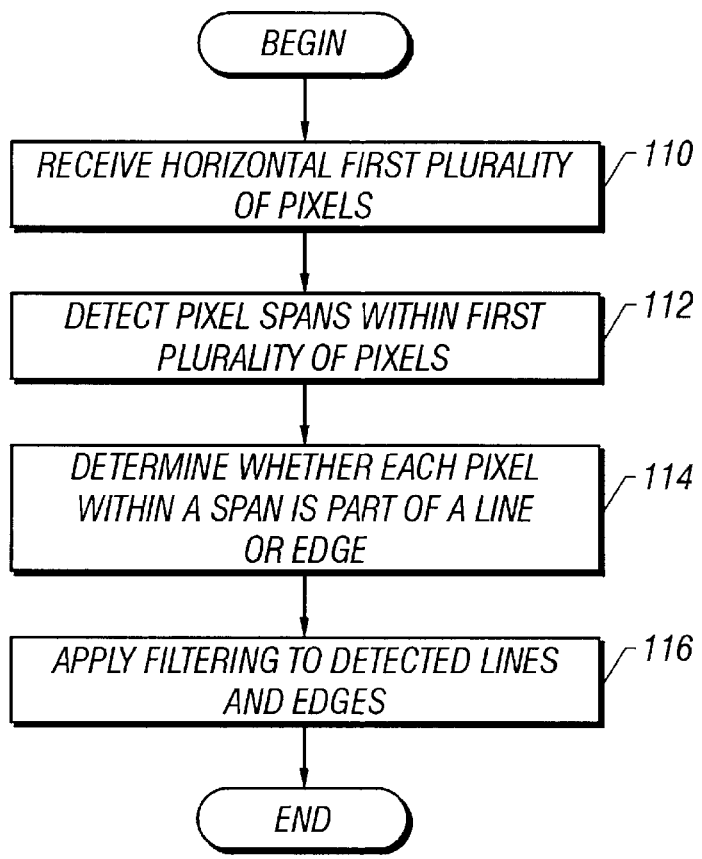
FIG. 7 is a flow diagram that illustrates a method for interlaced image enhancement in accordance with one embodiment of the present invention.

Turning now to FIG. 7, a flow diagram that illustrates a method for interlaced image enhancement is presented. At reference numeral 110, a group of axially aligned pixels such as a horizontal scan line is received. Each pixel has color component (chroma) and brightness (luma) values associated with it. The color spaces supported may be Red, Green, Blue (RGB) or YUV, for example. At reference numeral 112, the scan line is traversed to detect groups of continuous pixels that may potentially comprise a graphical line or edge. Each of these groups is called a pixel span. At reference numeral 114, a determination is made regarding whether each pixel in a pixel span is part of a line or edge. At reference numeral 116, filtering is applied to detected lines and edges to reduce the effect of flicker. Pixels that are not detected as lines or edges use the pixel color component values from the unfiltered scan line for display. Small font characters are not filtered, thus providing a resultant display having relatively little flicker and relatively sharp small type characters.

Figure 8:
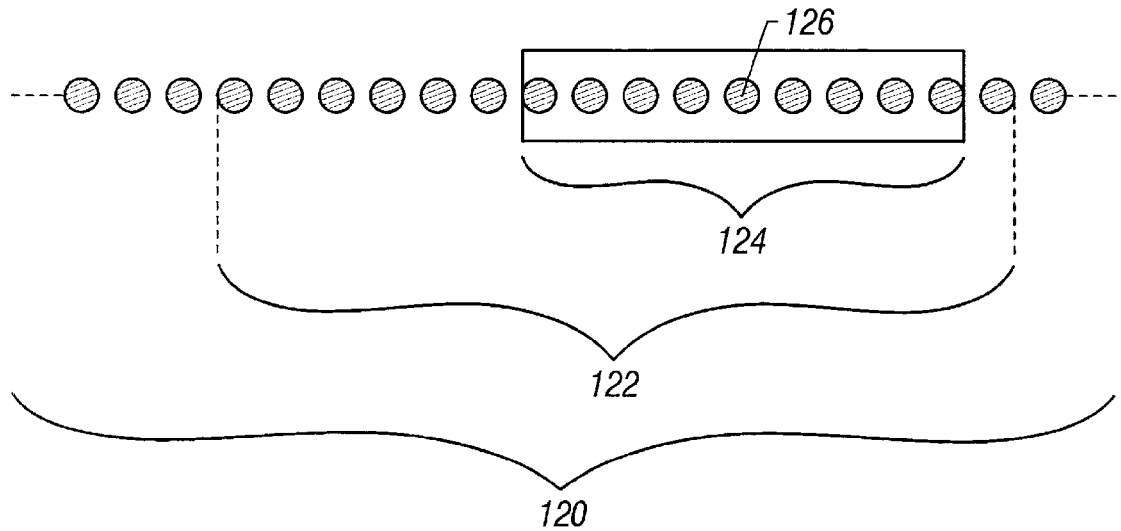
FIG. 8 is a block diagram that illustrates a pixel span and a pixel window in accordance with one embodiment of the present invention.

Turning now to FIG. 8, a block diagram that illustrates a pixel span and a pixel window is presented. A portion of a scan line is represented at reference numeral 120. Each pixel within scan line 120 has associated color components and a luminosity value. Pixel span 122 includes sixteen pixels of the scan line 120. The pixels within pixel span 122 are said to be continuous, based on the relationship between the luma or chroma its values of adjacent pixels. Pixel window 124 includes nine pixels within the pixel span 122. The pixel window 124 has a middle portion that includes the current pixel 126. Pixel window 124 is shifted to the left or right based on the current pixel 126 such that the current pixel 126 is positioned within the middle portion of the pixel window 124.

Figure 9:
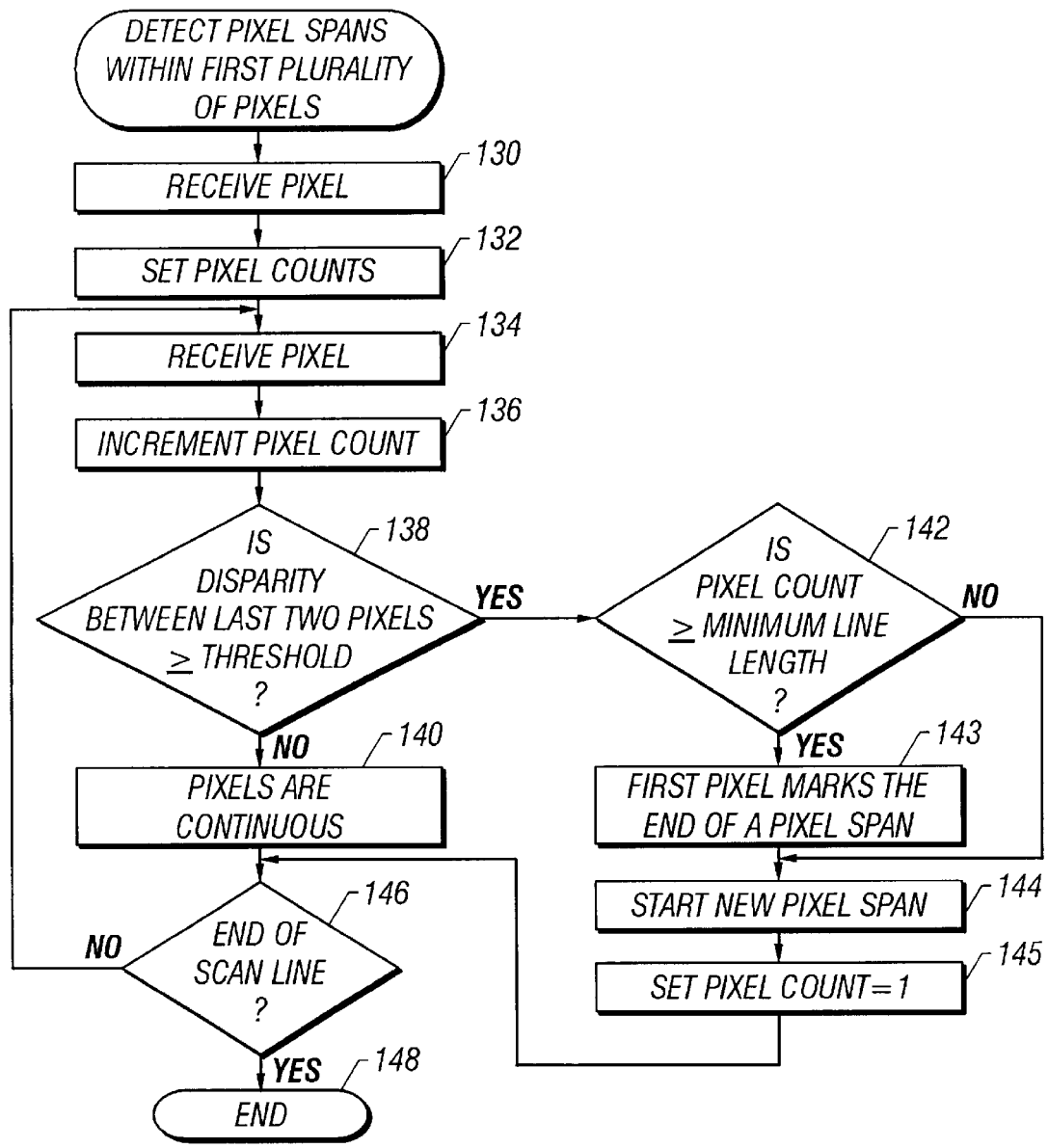
FIG. 9 is a flow diagram that illustrates a method for detecting pixel spans within a scan line in accordance with one embodiment of the present invention.

Turning now to FIG. 9, a flow diagram that illustrates a method for detecting pixel spans within a scan line in accordance with one embodiment of the present invention is presented. At reference numeral 130, a pixel is received. At reference numeral 132, a pixel count is initialized to indicate the start of a new span. At reference numeral 134, a second pixel is received. At reference numeral 136, the pixel count is incremented. At reference numeral 138, a determination is made regarding whether the disparity between the last two pixels received is greater than a pixel disparity threshold. At reference numeral 140, an indication that the last two pixels are continuous is made when the disparity is less than the pixel disparity threshold. According to one embodiment of the present invention, the pixel disparity threshold is one IRE unit.

At reference numeral 142, the pixel count is compared with a minimum line length. The minimum line length is the minimum number of pixels required to form a pixel span. If the pixel count is greater than or equal to the minimum line length, an indication that the pixel received at reference numeral 130 is the last pixel in the pixel span is made at reference numeral 143 and an indication that the pixel received at reference numeral 134 is the beginning of a new pixel span is made at reference numeral 144. At reference numeral 145, the pixel count is updated to indicate the beginning of a new span. At reference numeral 146, a determination is made regarding whether the end of a scan line has been reached. If the end of a scan line has not been reached, the next pixel is received at reference numeral 134. Execution terminates at reference numeral 148 when the last pixel of a scan line has been processed.

According to one embodiment of the present invention, the length of the pixel window is directly related to a viewing distance. The ability to perceive flicker is directly related to the distance between a viewer and a display. A viewer positioned relatively close to a display can discern flicker more easily than a viewer positioned relatively far from a display.

Figure 10:
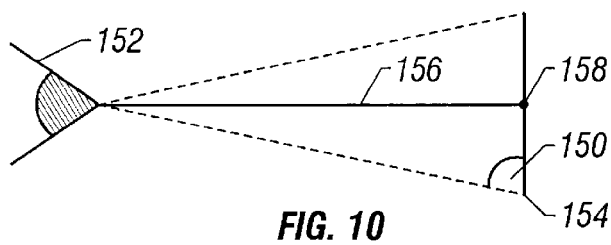
FIG. 10 is a block diagram that illustrates the relationship between a viewing angle and a pixel window in accordance with one embodiment of the present invention.

According to one embodiment of the present invention, the length of the pixel window is selected to maintain a viewing angle. The viewing angle is illustrated in FIG. 10. The viewing angle 150 is the angle between a viewer 152 and one end of a pixel window 154 centered 158 about a viewer line of sight 156. Thus, when increasing the distance between the viewer 152 and the pixel window 154, the pixel window 154 is increased to maintain the viewing angle 150. According to one embodiment of the present invention, the viewing angle is 1.5.

According to another embodiment of the present invention, the length of the pixel window is directly related to the number of pixels scanned within a time period. A relatively high number of pixels scanned per time period requires a relatively long pixel window. According to another embodiment of the present invention, the length of the pixel window is equal to the number of pixels scanned within one microsecond.

Once pixel spans have been identified, lines and edges within a pixel span are determined by traversing the pixels in a pixel span. For each pixel, a pixel window having a middle portion is defined such that the current pixel is contained within the middle portion and the pixel window is contained entirely within the current pixel span. A determination regarding whether a pixel is part of a line or edge is made based upon the cumulative horizontal disparity and the cumulative vertical disparity of pixels that lie around the current pixel and are located within the pixel window. A horizontal correlation exists if the cumulative horizontal disparity of the pixels within the pixel window does not exceed a cumulative horizontal threshold. A vertical correlation exists if the cumulative vertical disparity of the pixels within the window does not fall below the cumulative vertical threshold.

Figure 11:
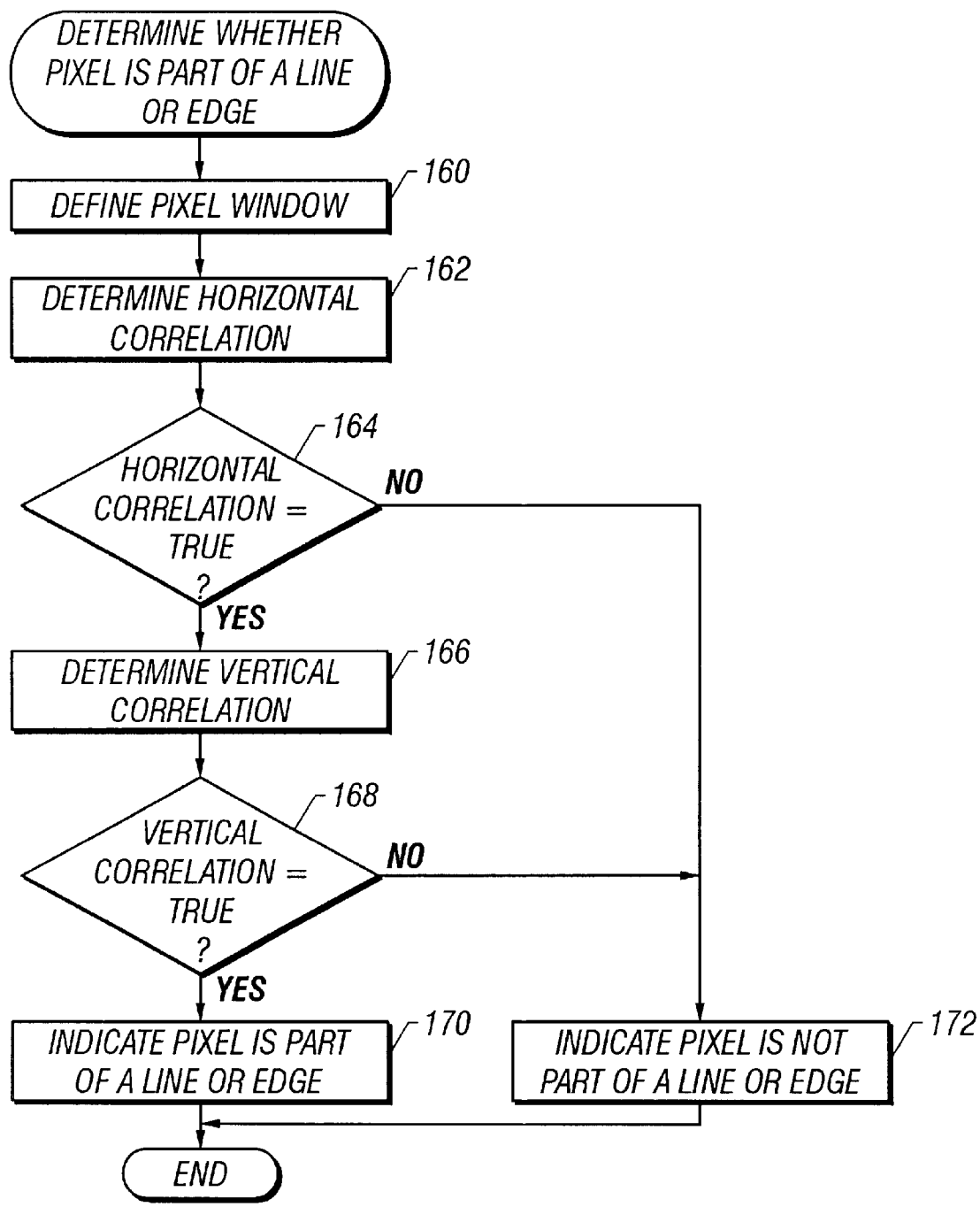
FIG. 11 is a flow diagram that illustrates a method for determining whether a pixel is part of a line or an edge in accordance with one embodiment of the present invention.

Turning now to FIG. 11, a flow diagram that illustrates a method for determining whether a pixel is part of a line or edge in accordance with one embodiment of the present invention is presented. At reference numeral 160, a pixel window 124 for the current pixel is defined. The pixel window 124 has a middle portion including the current pixel 126. The entire pixel window is 124 contained within the current pixel span 122. At reference numeral 162, the horizontal correlation for the current pixel is determined. At reference numeral 164, a determination is made regarding whether horizontal correlation exists. If horizontal correlation exists, the vertical correlation for the current pixel is determined at reference numeral 166. At reference numeral 168, a determination is made regarding whether vertical correlation exists. If vertical correlation exists, an indication that the current pixel is part of a line or edge is made at reference numeral 170. If either horizontal correlation or vertical correlation do not exist for the current pixel, an indication that the current pixel is not part of a line or edge is made at reference numeral 172.

The order of determining whether a horizontal correlation exists and whether a vertical correlation exists is not intended to be limiting in any way. The vertical correlation determination may also be performed before the horizontal correlation determination. Regardless of the order, a pixel is indicated as part of a line-or edge after both vertical and horizontal correlations have been determined.

Figure 12:
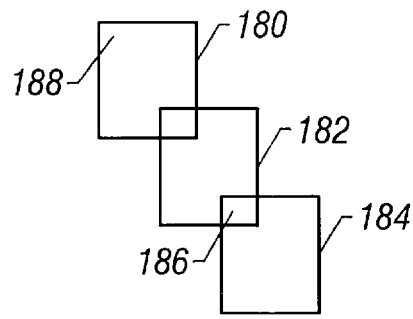
FIG. 12 is a block diagram that illustrates temporal correlation in accordance with one embodiment of the present invention.

Turning now to FIG. 12, a block diagram that illustrates temporal correlation in accordance with one embodiment of the present invention is presented. According to this embodiment of the present invention, a pixel is said to be part of a line or edge when horizontal, vertical and temporal correlation exist for that pixel. Three consecutive frames are represented by reference numerals 180, 182 and 184. Pixel 186 represents a pixel from the current frame and pixel 188 represents the same pixel from an earlier frame. The difference between luma or chroma values for pixels 186 and 188 is compared to a temporal threshold. Temporal correlation is said to exist when the difference between luma or chroma values for pixels in different frames is less than or equal to the temporal threshold.

Figure 13:
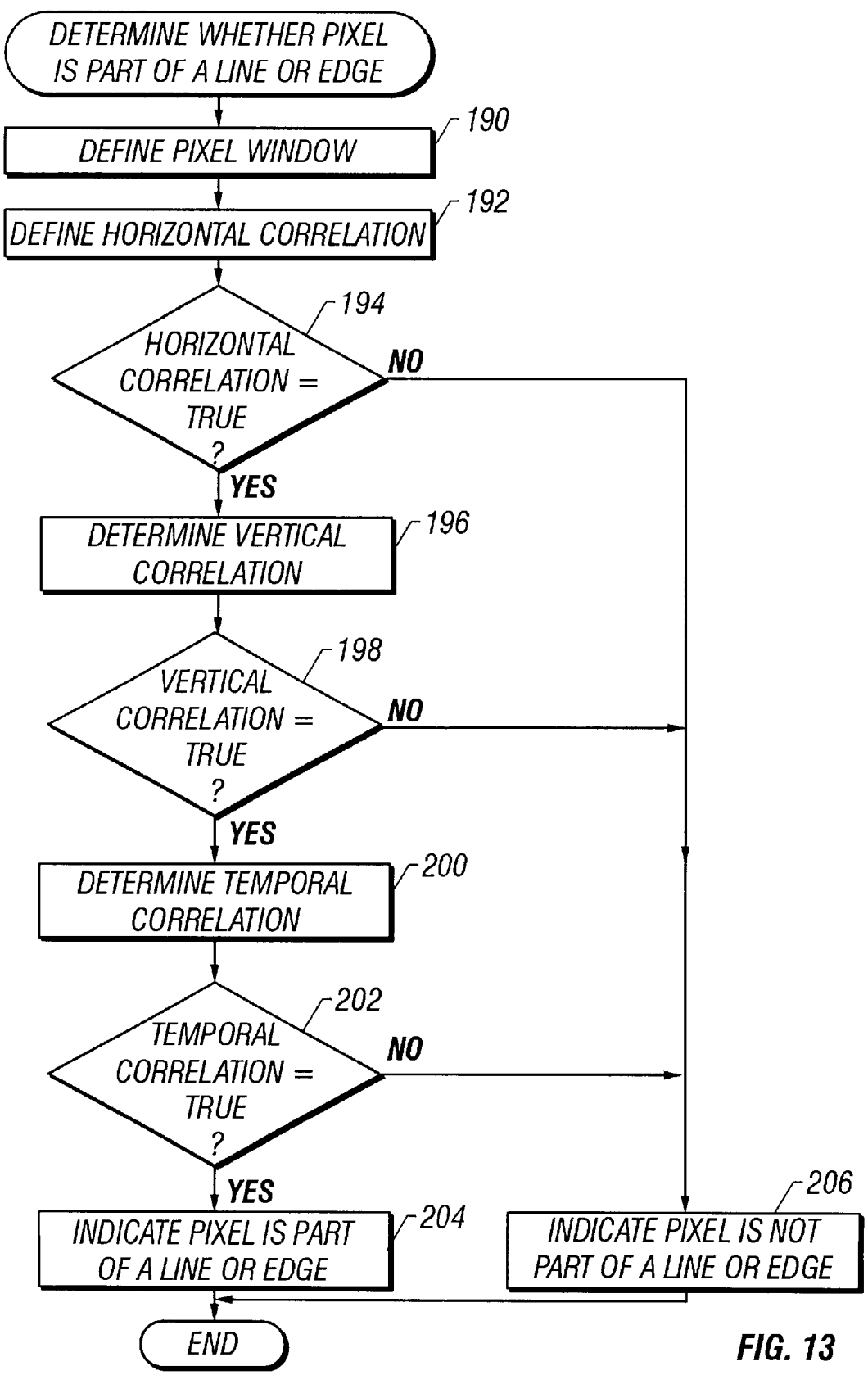
FIG. 13 is a flow diagram that illustrates a method for determining whether a pixel is part of a line or edge in accordance with one embodiment of the present invention.

Turning now to FIG. 13, a flow diagram that illustrates a method for determining whether a pixel is part of a line or edge in accordance with one embodiment of the present invention is presented. This embodiment checks for temporal correlation between pixels, in addition to checking for vertical and horizontal correlation as in the embodiment represented by FIG. 11. At reference numeral 190, a pixel window 124 for the current pixel is defined. The pixel window 124 has a middle portion including the current pixel 126. The entire pixel window 124 is contained within the current pixel span 122. At reference numeral 192, the horizontal correlation for the current pixel is determined. At reference numeral 194, a determination is made regarding whether horizontal correlation exists. If horizontal correlation exists, the vertical correlation for the current pixel is determined at reference numeral 196. At reference numeral 198, a determination is made regarding whether vertical correlation exists. If vertical correlation exists, the temporal correlation for the current pixel is determined at reference numeral 200. At reference numeral 202, a determination is made regarding whether temporal correlation exists. If temporal correlation exists, an indication that the current pixel is part of a line or edge is made at reference numeral 204. If any of horizontal correlation, vertical correlation, or temporal correlation do not exist for the current pixel, an indication that the current pixel is not part of a line or edge is made at reference numeral 206. A pixel is said to be part of a line or edge when horizontal, vertical and temporal correlation exist for that pixel.

Figure 14:
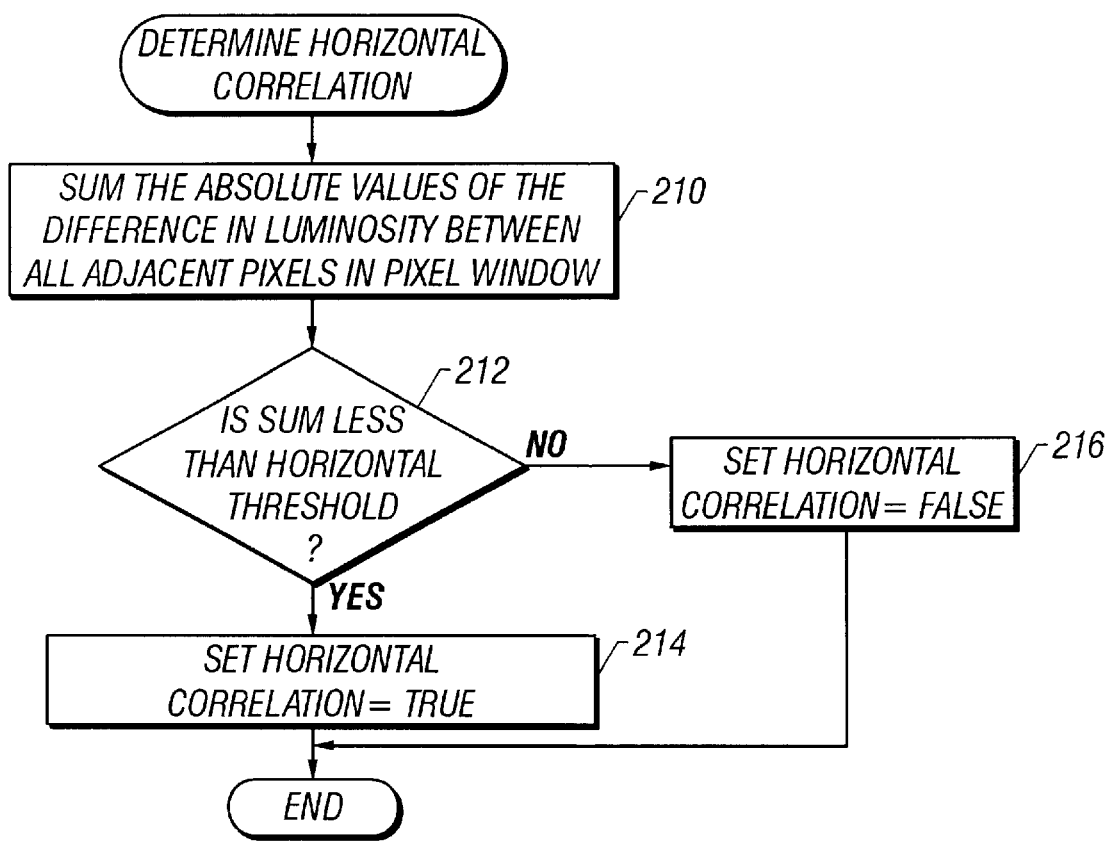
FIG. 14 is a flow diagram that illustrates a method for determining whether a horizontal correlation exists for a pixel in accordance with one embodiment of the present invention.

Turning now to FIG. 14, a flow diagram that illustrates a method for determining whether a horizontal correlation exists for a pixel in accordance with one embodiment of the present invention is presented. At reference numeral 210, the absolute values of the difference in luma or chroma between all adjacent pixels in the current pixel window are summed. At reference numeral 212, a determination is made regarding whether the sum is less than a horizontal threshold. If the sum is less than the horizontal threshold, an indication that horizontal correlation exists is made at reference numeral 214. If the sum is not less than the horizontal threshold, an indication that horizontal correlation does not exist is made at reference numeral 216. According to one embodiment of the present invention, the horizontal threshold is one IRE unit.

Figure 15:
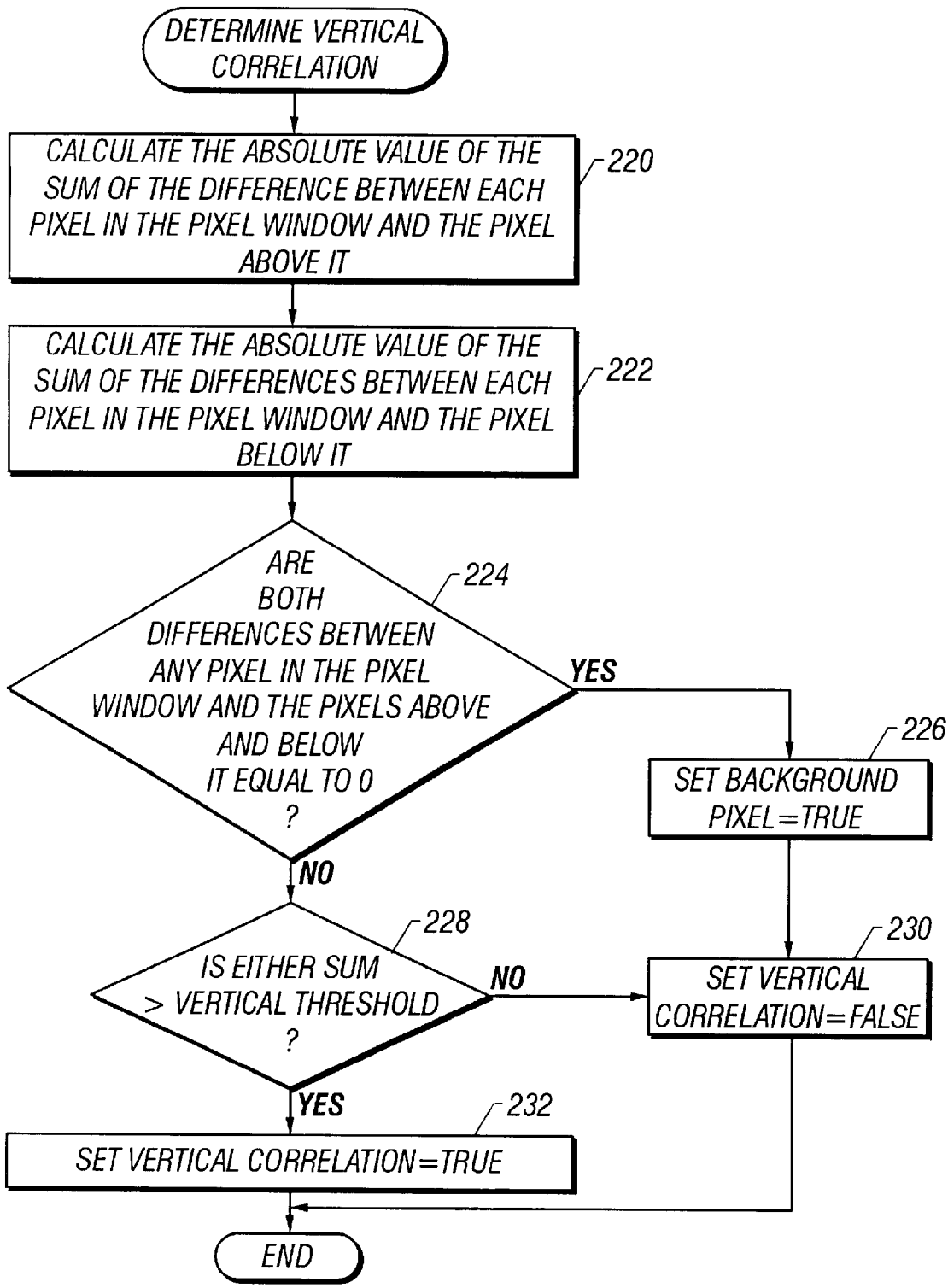
FIG. 15 is a flow diagram that illustrates a method for determining whether a vertical correlation exists for a pixel in accordance with one embodiment of the present invention.

Turning now to FIG. 15, a flow diagram that illustrates a method for determining whether a vertical correlation exists for a pixel in accordance with one embodiment of the present invention is presented. At reference numeral 220, a first cumulative vertical disparity is determined by calculating the absolute value of the sum of the differences in luma or chroma between each pixel in the pixel window and the one directly above it.

A reference numeral 224, a determination is made regarding whether the difference between any pixel in the pixel window and the difference between the same pixel in the pixel window and the one below it are both 0. If both differences are 0 for any pixel in the pixel window, an indication that the pixel is a background pixel is made at reference numeral 226. If both differences are not 0 for all pixels in the pixel window, a determination regarding whether either sum calculated at reference numerals 220 and 222 is greater than a vertical threshold is made at reference numeral 228. If either sum is greater than the vertical threshold, an indication that vertical correlation does exist is made at reference numeral 232. If either sum is not greater than the vertical threshold, an indication that vertical correlation does not exist is made at reference numeral 230. According to one embodiment of the present invention, the vertical threshold is one IRE unit.

Figure 16:
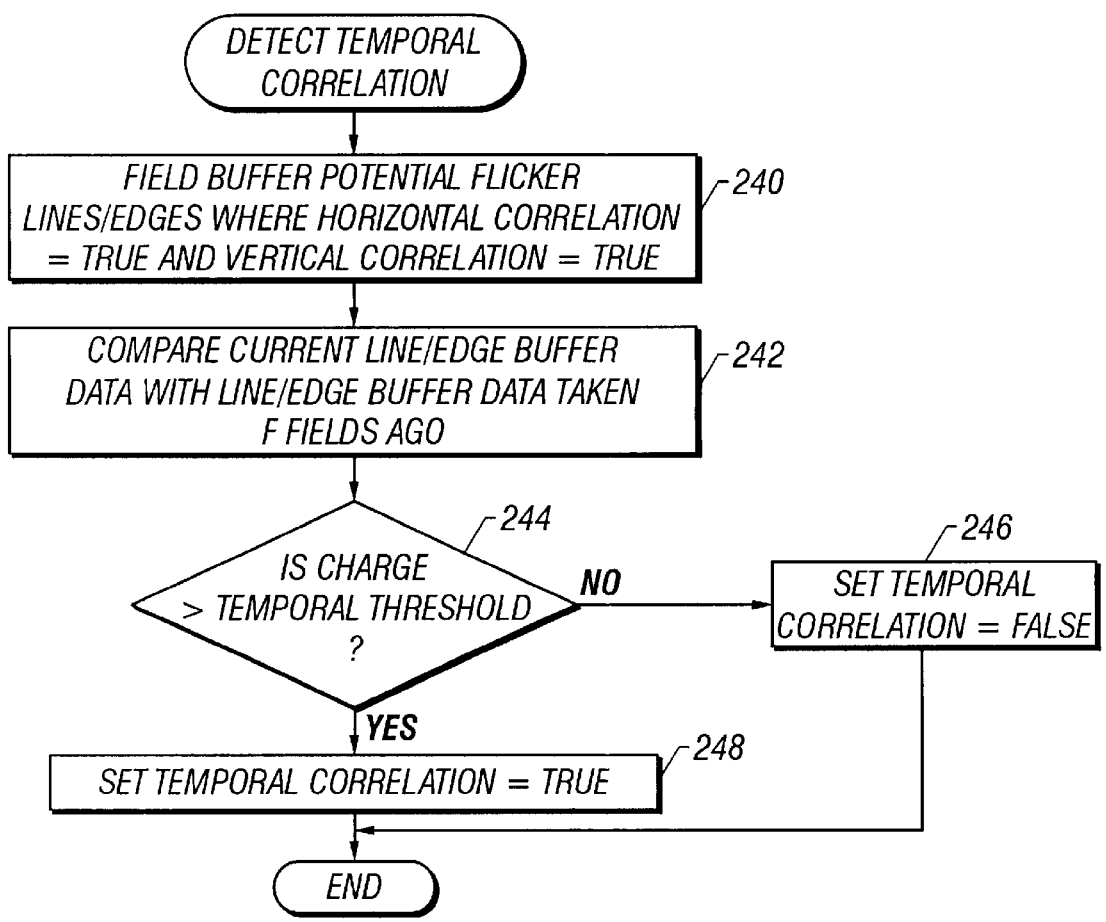
FIG. 16 is a flow diagram that illustrates a method for determining whether a temporal correlation exists for a pixel in accordance with one embodiment of the present invention.

Turning now to FIG. 16, a flow diagram that illustrates a method for determining whether a temporal correlation exists for a pixel in accordance with one embodiment of the present invention is presented. At reference numeral 240, pixel data for lines and edges where horizontal and vertical correlation exist are buffered for a predetermined number of frames. At reference numeral 242, the current pixel data for a line or edge is compared with buffered line or edge data stored earlier. At reference numeral 244, a determination is made regarding whether the difference between the current pixel data and the buffered data is greater than a temporal threshold. If the difference is greater s than a temporal threshold, an indication that temporal correlation does not exist is made a reference numeral 246. If the difference is not greater than the temporal threshold, an indication that temporal correlation does not exist is made at reference numeral 248. According to one embodiment of the present invention, the temporal threshold is one IRE unit.

The description of specific threshold values is not intended to be limiting in any way. Those of ordinary skill in the art will recognize that other threshold values may be used.

According to one embodiment of the present invention, the frames are buffered for two frames. Thus, the pixel data for frame n is compared with the pixel data for frame n+2. With reference to FIG. 12, pixel 186 in frame 184 is compared with pixel 188 in frame 180. If the difference in luma or chroma values for pixel 186 and 188 exceeds the temporal threshold, the filtered color component values are displayed. Otherwise, the color component values from the unfiltered line are displayed.

The description of the number of frames buffered is not intended to be limiting in any way. Those of ordinary skill in the art will recognize that the invention may be applied to buffer sizes. Additionally, those of ordinary skill in the art will recognize that only the older frame to be compared need be buffered.

According to one embodiment of the present invention, relatively long filters are used for detected lines and edges having relatively large contrast, such that each step of the filter response is smaller than a visual flicker threshold. The ability to perceive flicker is directly related to the contrast level. A display having relatively high contrast levels requires a filter having a relatively large number of steps. A display having relatively low contrast levels requires a filter having a relatively small number of steps.

According to a presently preferred embodiment, the present invention may be implemented in software or firmware, as well as in programmable gate array devices, Application Specific Integrated Circuits (ASICs), and other hardware.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for image enhancement for an interlaced display, comprising:
   receiving a first plurality of pixels aligned about an axis;
   detecting a second plurality of pixels within said first plurality of pixels, each pixel of said second plurality of pixels having a luma or chroma disparity between adjacent pixels less than a first threshold;
   determining whether each pixel within said second plurality of pixels is part of a line or edge, said determination including a comparison of luma or chroma disparities between neighboring pixels; and
   filtering each pixel determined to be part of a line or edge, wherein said determining whether each pixel within said second plurality of pixels is part of a line or edge further comprises:
      selecting a first pixel within said second plurality of pixels;
      defining a pixel window including a plurality of pixels within said second plurality of pixels, said pixel window having a length equal to the number of pixels within said pixel window, said pixel window including a middle portion, said first pixel positioned within said middle portion;
      determining whether a horizontal correlation within said pixel window exists for said first pixel;
      determining whether a vertical correlation within said pixel window exists for said first pixel when a horizontal correlation exists for said first pixel; and
      indicating said first pixel is part of a line or edge when horizontal correlation and vertical correlation exist for said first pixel.

2. The method of claim 1 wherein said determining whether a horizontal correlation within said pixel window exists for said first pixel further comprises:
   summing the absolute values of the differences in luma or chroma between all adjacent pixels in said pixel window to create a cumulative horizontal disparity; and
   indicating horizontal correlation exists when said sum is less than a horizontal threshold.

3. The method of claim 1 wherein said determining whether a vertical correlation within said pixel window exists for said first pixel comprises:
   calculating the absolute value of the sum of the differences between each pixel in said pixel window and the pixel above it to create a first sum;
   calculating the absolute value of the sum of the differences between each pixel in said pixel window and the pixel below it to create a second sum;
   indicating vertical correlation does not exist when the differences in luma or chroma between any pixel in said pixel window and the pixels above and below it are both zero;
   indicating vertical correlation does exist when either of said first sum or said second sum is greater than a vertical threshold; and
   indicating vertical correlation does not exist when said both said first sum and said second sum are less than or equal to said vertical threshold.

4. A method for image enhancement for an interlaced display, comprising:
   receiving a first plurality of pixels aligned about an axis;
   detecting a second plurality of pixels within said first plurality of pixels, each pixel of said second plurality of pixels having a luma or chroma disparity between adjacent pixels less than a first threshold;
   determining whether each pixel within said second plurality of pixels is part of a line or edge, said determination including a comparison of luma or chroma disparities between neighboring pixels; and
   filtering each pixel determined to be part of a line or edge, wherein said determining whether each pixel within said second plurality of pixels is part of a line or edge further comprises:
      selecting a first pixel within said second plurality of pixels;
      defining a pixel window including a plurality of pixels within said second plurality of pixels, said pixel window having a length equal to the number of pixels within said pixel window, said pixel window including a middle portion, said first pixel positioned within said middle portion;
      determining whether a horizontal correlation within said pixel window exists for said first pixel;
      determining whether a vertical correlation within said pixel window exists for said first pixel when a horizontal correlation exists for said first pixel;
      determining whether a temporal correlation within said pixel window exists for said first pixel when a vertical correlation exists for said first pixel; and
      indicating said first pixel is part of a line or edge when horizontal correlation, vertical correlation and temporal correlation exist for said first pixel.

5. The method of claim 4 wherein said determining whether a temporal correlation within said pixel window exists for said first pixel further comprises:

buffering potential flicker lines or edges when horizontal correlation and vertical correlation exist, said potential lines or edges buffered for a predetermined number of frames;

comparing a current luma or chroma of said first pixel with a buffered luma or chroma of said first pixel; and indicating a temporal correlation exists when the difference between said current luma or chroma of said first pixel and said buffered luma or chroma of said first pixel is greater than a temporal threshold.

6. The method of claim 5 wherein said predetermined number of frames is selected to allow comparison of said current luma or chroma of a pixel with the luma or chroma of said pixel from a frame displayed at least two frames earlier.

7. The method of claim 5 wherein said current luma or chroma of said first pixel is compared with a buffered luma or chroma of said first pixel that was stored two frames previous to said current luma or chroma.

8. The method of claim 5 wherein said filtering exhibits a filter response and said filtering further comprises using relatively long filters for detected lines and edges having relatively high chroma such that each step of the filter response is smaller than a visual flicker threshold.

9. The method of claim 5 wherein said filtering exhibits a filter response and said filtering further comprises using relatively long filters for detected lines and edges having relatively large contrast such that each step of the filter response is smaller than a visual flicker threshold.

10. The method of claim 5 wherein said length of said pixel window is directly related to a viewing distance.

11. The method of claim 5 wherein said length of said pixel window is selected to maintain a viewing angle.

12. The method of claim 11 wherein said viewing angle comprises the angle between an endpoint of a pixel window and said viewing angle comprises the angle between an endpoint of a pixel window and a viewing position; and said viewing angle is 1.5°.

13. The method of claim 5 wherein said length of said pixel window is directly related to the number of pixels scanned within a time period.

14. The method of claim 13 wherein said length of said pixel window is equal to the number of pixels scanned within one microsecond.

15. The method of claim 5, further comprising:

scaling the image to create a second image having a resolution about equal to a display resolution before performing the image enhancement; and performing the image enhancement on said second image.

16. A computer system, comprising:

a bus;

a first processor coupled to said bus;

a second processor coupled to said bus, said second processor comprising:

a video data interface for receiving video data;

a vertical filter coupled to said video data interface, said vertical filter to detect inter-line correlation between pixels;

a horizontal filter coupled to the output of said vertical filter, said horizontal filter to detect line correlation between pixels when inter-line correlation is detected;

a temporal filter coupled to the output of said horizontal filter, said temporal filter to detect temporal correlation between a current pixel and a buffered pixel when line correlation is detected, said buffered pixel from a previous frame; and a flicker filter coupled to the output of said temporal filter, said flicker filter to filter pixels having temporal correlation;

a storage device coupled to said bus, said storage device to store video data sent to said second processor via said bus under the control of said first processor; and a display coupled to said second processor, said display to display video data from said second processor.

17. A method for image enhancement for an interlaced display, the method comprising:

receiving a first plurality of pixels aligned about an axis;

detecting a second plurality of pixels within the first plurality of pixels, each pixel of the second plurality of pixels having a luma or chroma disparity between adjacent pixels less than a first threshold;

determining whether each pixel within the second plurality of pixels is part of a line or edge through a comparison of luma or chroma disparities between neighboring pixels, the determining comprises:

selecting a first pixel within the second plurality of pixels;

defining a pixel window including a plurality of pixels within the second plurality of pixels, the pixel window having a length equal to the number of pixels within the pixel window, the pixel window including a middle portion, the first pixel positioned within the middle portion;

determining whether a vertical correlation within the pixel window exists for the first pixel;

determining whether a horizontal correlation within the pixel window exists for the first pixel when a vertical correlation exists for the first pixel; and indicating the first pixel is part of a line or edge when vertical correlation and horizontal correlation exist for the first pixel; and filtering each pixel determined to be part of a line or edge.

18. The method as defined in claim 17, wherein the determining whether a vertical correlation within the pixel window exists for the first pixel comprises:

calculating the absolute value of the sum of the differences between each pixel in the pixel window and the pixel above it to create a first sum;

calculating the absolute value of the sum of the differences between each pixel in the pixel window and the pixel below it to create a second sum;

indicating vertical correlation does not exist when the differences in luma or chroma between any pixel in the pixel window and the pixels above and below it are both zero;

indicating vertical correlation does exist when either of the first sum or the second sum is greater than a vertical threshold; and indicating vertical correlation does not exist when the both the first sum and the second sum are less than or equal to the vertical threshold.

19. The method as defined in claim 17, wherein the determining whether a horizontal correlation within the pixel window exists for the first pixel comprises:

summing the absolute values of the differences in luma or chroma between all adjacent pixels in the pixel window to create a cumulative horizontal disparity; and indicating horizontal correlation exists when the sum is less than a horizontal threshold.

20. A method for image enhancement for an interlaced display, the method comprising:
receiving a first plurality of pixels aligned about an axis;
detecting a second plurality of pixels within the first plurality of pixels, each pixel of the second plurality of pixels having a luma or chroma disparity between adjacent pixels less than a first threshold;
determining whether each pixel within the second plurality of pixels is part of a line or edge through a comparison of luma or chroma disparities between neighboring pixels, the determining comprises:
selecting a first pixel within the second plurality of pixels;
defining a pixel window including a plurality of pixels within the second plurality of pixels, the pixel window having a length equal to the number of pixels within the pixel window, the pixel window including a middle portion, the first pixel positioned within the middle portion;
determining whether a vertical correlation within the pixel window exists for the first pixel;
determining whether a horizontal correlation within the pixel window exists for the first pixel when a vertical correlation exists for the first pixel;
determining whether a temporal correlation within the pixel window exists for the first pixel when a horizontal correlation exists for the first pixel; and
indicating the first pixel is part of a line or edge when vertical correlation, horizontal correlation, and temporal correlation exist for the first pixel; and
filtering each pixel determined to be part of a line or edge.

21. The method as defined in claim 20, wherein the determining whether a temporal correlation within the pixel window exists for the first pixel further comprises:
buffering potential flicker lines or edges when horizontal correlation and vertical correlation exist, the potential lines or edges buffered for a predetermined number of frames;
comparing a current luma or chroma of the first pixel with a buffered luma or chroma of the first pixel; and
indicating a temporal correlation exists when the difference between the current luma or chroma of the first pixel and the buffered luma or chroma of the first pixel is greater than a temporal threshold.

22. The method as defined in claim 21, wherein the predetermined number of frames is selected to allow comparison of the current luma or chroma of a pixel with the luma or chroma of the pixel from a frame displayed at least two frames earlier.

23. The method as defined in claim 21, wherein the current luma or chroma of the first pixel is compared with a buffered luma or chroma of the first pixel that was stored two frames previous to the current luma or chroma.

24. The method as defined in claim 21, wherein the filtering exhibits a filter response and the filtering further comprises using relatively long filters for detected lines and edges having relatively high chroma such that each step of the filter response is smaller than a visual flicker threshold.

25. The method as defined in claim 21, wherein the filtering exhibits a filter response and the filtering further comprises using relatively long filters for detected lines and edges having relatively large contrast such that each step of the filter response is smaller than a visual flicker threshold.

26. The method as defined in claim 21, wherein the length of the pixel window is directly related to a viewing distance.

27. The method as defined in claim 21, wherein the length of the pixel window is selected to maintain a viewing angle.

28. The method as defined in claim 27, wherein:
the viewing angle comprises the angle between an endpoint of a pixel window and a viewing position; and
the viewing angle is about 1.5.

29. The method as defined in claim 21, wherein the length of the pixel window is directly related to the number of pixels scanned within a time period.

30. The method as defined in claim 29, wherein the length of the pixel window is equal to the number of pixels scanned within one microsecond.

31. The method as defined in claim 21, further comprising:
scaling the image to create a second image having a resolution about equal to a display resolution before performing the image enhancement; and
performing the image enhancement on the second image.

32. The method as defined in claim 20, wherein the determining whether a horizontal correlation within the pixel window exists for the first pixel comprises:
summing the absolute values of the differences in luma or chroma between all adjacent pixels in the pixel window to create a cumulative horizontal disparity; and
indicating horizontal correlation exists when the sum is less than a horizontal threshold.

33. The method as defined in claim 20, wherein the determining whether a vertical correlation within the pixel window exists for the first pixel comprises:
calculating the absolute value of the sum of the differences between each pixel in the pixel window and the pixel above it to create a first sum;
calculating the absolute value of the sum of the differences between each pixel in the pixel window and the pixel below it to create a second sum;
indicating vertical correlation does not exist when the differences in luma or chroma between any pixel in the pixel window and the pixels above and below it are both zero;
indicating vertical correlation does not exist when either of the first sum or the second sum is greater than a vertical threshold; and
indicating vertical correlation does not exist when the both the first sum and the second sum are less than or equal to the vertical threshold.

34. A computer system comprising:
a bus;
a first processor coupled to the bus;
a second processor coupled to the bus, the second processor comprising:
a video data interface for receiving video data;
a horizontal filter coupled to the video data interface, the horizontal filter to detect line correlation between pixels;
a vertical filter coupled to the output of the horizontal filter, the vertical filter to detect inter-line correlation between pixels when line correlation is detected;
a temporal filter coupled to the output of the vertical filter, the temporal filter to detect temporal correlation between a current pixel and a buffered pixel when inter-line correlation is detected, the buffered pixel from a previous frame; and
a flicker filter coupled to the output of the temporal filter, the flicker filter to filter pixels having temporal correlation;
a storage device coupled to the bus, the storage device to store video data sent to the second processor via the bus under the control of the first processor; and a display coupled to the second processor, the display to display video data from the second processor.

35. An apparatus for image enhancement for an interlaced display, the apparatus comprising:
  means for receiving a first plurality of pixels aligned about an axis;
  means for detecting a second plurality of pixels within the first plurality of pixels, each pixel of the second plurality of pixels having a luma or chroma disparity between adjacent pixels less than a first threshold;
  means for determining whether each pixel within the second plurality of pixels is part of a line or edge through a comparison of luma or chroma disparities between neighboring pixels, the means for determining comprises:
    means for selecting a first pixel within the second plurality of pixels;
    means for defining a pixel window including a plurality of pixels within the second plurality of pixels, the pixel window having a length equal to the number of pixels within the pixel window, the pixel window including a middle portion, the first pixel positioned within the middle portion;
    means for determining whether a horizontal correlation within the pixel window exists for the first pixel;
    means for determining whether a vertical correlation within the pixel window exists for the first pixel when a horizontal correlation exists for the first pixel; and
    means for indicating the first pixel is part of a line or edge when horizontal correlation and vertical correlation exist for the first pixel; and
  means for filtering each pixel determined to be part of a line or edge.

36. The apparatus as defined in claim 35, wherein the means for determining whether a horizontal correlation within the pixel window exists for the first pixel comprises:
  means for summing the absolute values of the differences in luma or chroma between all adjacent pixels in the pixel window to create a cumulative horizontal disparity; and
  means for indicating horizontal correlation exists when the sum is less than a horizontal threshold.

37. The apparatus as defined in claim 35, wherein the means for determining whether a vertical correlation within the pixel window exists for the first pixel comprises:
  means for calculating the absolute value of the sum of the differences between each pixel in the pixel window and the pixel above it to create a first sum;
  means for calculating the absolute value of the sum of the differences between each pixel in the pixel window and the pixel below it to create a second sum;
  means for indicating vertical correlation does not exist when the differences in luma or chroma between any pixel in the pixel window and the pixels above and below it are both zero;
  means for indicating vertical correlation does not exist when either of the first sum or the second sum is greater than a vertical threshold; and
  means for indicating vertical correlation does not exist when the both the first sum and the second sum are less than or equal to the vertical threshold.

38. An apparatus for image enhancement for an interlaced display, the apparatus comprising:
  means for receiving a first plurality of pixels aligned about an axis;
  means for detecting a second plurality of pixels within the first plurality of pixels, each pixel of the second plurality of pixels having a luma or chroma disparity between adjacent pixels less than a first threshold;
  means for determining whether each pixel within the second plurality of pixels is part of a line or edge through a comparison of luma or chroma disparities between neighboring pixels, the means for determining comprises:
    means for selecting a first pixel within the second plurality of pixels;
    means for defining a pixel window including a plurality of pixels within the second plurality of pixels, the pixel window having a length equal to the number of pixels within the pixel window, the pixel window including a middle portion, the first pixel positioned within the middle portion;
    means for determining whether a horizontal correlation within the pixel window exists for the first pixel;
    means for determining whether a vertical correlation within the pixel window exists for the first pixel when a horizontal correlation exists for the first pixel;
    means for determining whether a temporal correlation within the pixel window exists for the first pixel when a vertical correlation exists for the first pixel; and
    means for indicating the first pixel is part of a line or edge when horizontal correlation, vertical correlation, and temporal correlation exist for the first pixel; and
  means for filtering each pixel determined to be part of a line or edge.

39. The apparatus as defined in claim 38, wherein the means for determining whether a temporal correlation within the pixel window exists for the first pixel further comprises:
  means for buffering potential flicker lines or edges when horizontal correlation and vertical correlation exist, the potential lines or edges buffered for a predetermined number of frames;
  means for comparing a current luma or chroma of the first pixel with a buffered luma or chroma of the first pixel; and
  means for indicating a temporal correlation exists when the difference between the current luma or chroma of the first pixel and the buffered luma or chroma of the first pixel is greater than a temporal threshold.

40. The apparatus as defined in claim 39, wherein the predetermined number of frames is selected to allow comparison of the current luma or chroma of a pixel with the luma or chroma of the pixel from a frame displayed at least two frames earlier.

41. The apparatus as defined in claim 39, wherein the current luma or chroma of the first pixel is compared with a buffered luma or chroma of the first pixel that was stored two frames previous to the current luma or chroma.

42. The apparatus as defined in claim 39, wherein the means for filtering exhibits a filter response and the means for filtering further comprises using relatively long filters for detected lines and edges having relatively high chroma such that each step of the filter response is smaller than a visual flicker threshold.

43. The apparatus as defined in claim 39, wherein the means for filtering exhibits a filter response and the means for filtering further comprises using relatively long filters for detected lines and edges having relatively large contrast such that each step of the filter response is smaller than a visual flicker threshold.

44. The apparatus as defined in claim 39, wherein the length of the pixel window is directly related to a viewing distance.

45. The apparatus as defined in claim 39, wherein the length of the pixel window is selected to maintain a viewing angle.

46. The apparatus as defined in claim 45, wherein:
   the viewing angle comprises the angle between an endpoint of a pixel window and a viewing position; and
   the viewing angle is about 1.5.

47. The apparatus as defined in claim 39, wherein the length of the pixel window is directly related to the number of pixels scanned within a time period.

48. The apparatus as defined in claim 47, wherein the length of the pixel window is equal to the number of pixels scanned within one microsecond.

49. The apparatus as defined in claim 39, further comprising:
   means for scaling the image to create a second image having a resolution about equal to a display resolution before performing the image enhancement; and
   means for performing the image enhancement on the second image.

50. The apparatus as defined in claim 38, wherein the means for determining whether a vertical correlation within the pixel window exists for the first pixel comprises:
   means for calculating the absolute value of the sum of the differences between each pixel in the pixel window and the pixel above it to create a first sum;
   means for calculating the absolute value of the sum of the differences between each pixel in the pixel window and the pixel below it to create a second sum;
   means for indicating vertical correlation does not exist when the differences in luma or chroma between any pixel in the pixel window and the pixels above and below it are both zero;
   means for indicating vertical correlation does not exist when either of the first sum or the second sum is greater than a vertical threshold; and
   means for indicating vertical correlation does not exist when the both the first sum and the second sum are less than or equal to the vertical threshold.

51. The apparatus as defined in claim 38, wherein the means for determining whether a horizontal correlation within the pixel window exists for the first pixel comprises:
   means for summing the absolute values of the differences in luma or chroma between all adjacent pixels in the pixel window to create a cumulative horizontal disparity; and
   means for indicating horizontal correlation exists when the sum is less than a horizontal threshold.

52. An apparatus for image enhancement for an interlaced display, the apparatus comprising:
   means for receiving a first plurality of pixels aligned about an axis;
   means for detecting a second plurality of pixels within the first plurality of pixels, each pixel of the second plurality of pixels having a luma or chroma disparity between adjacent pixels less than a first threshold;
   means for determining whether each pixel within the second plurality of pixels is part of a line or edge through a comparison of luma or chroma disparities between neighboring pixels, the means for determining comprises:
      means for selecting a first pixel within the second plurality of pixels;
      means for defining a pixel window including a plurality of pixels within the second plurality of pixels, the pixel window having a length equal to the number of pixels within the pixel window, the pixel window including a middle portion, the first pixel positioned within the middle portion;
      means for determining whether a vertical correlation within the pixel window exists for the first pixel;
      means for determining whether a horizontal correlation within the pixel window exists for the first pixel when a vertical correlation exists for the first pixel; and
      means for indicating the first pixel is part of a line or edge when vertical correlation and horizontal correlation exist for the first pixel; and
   means for filtering each pixel determined to be part of a line or edge.

53. The apparatus as defined in claim 52, wherein the means for determining whether a vertical correlation within the pixel window exists for the first pixel comprises:
   means for calculating the absolute value of the sum of the differences between each pixel in the pixel window and the pixel above it to create a first sum;
   means for calculating the absolute value of the sum of the differences between each pixel in the pixel window and the pixel below it to create a second sum;
   means for indicating vertical correlation does not exist when the differences in luma or chroma between any pixel in the pixel window and the pixels above and below it are both zero;
   means for indicating vertical correlation does not exist when either of the first sum or the second sum is greater than a vertical threshold; and
   means for indicating vertical correlation exists when the both the first sum and the second sum are less than or equal to the vertical threshold.

54. The apparatus as defined in claim 52, wherein the means for determining whether a horizontal correlation within the pixel window exists for the first pixel comprises:
   means for summing the absolute values of the differences in luma or chroma between all adjacent pixels in the pixel window to create a cumulative horizontal disparity; and
   means for indicating horizontal correlation exists when the sum is less than a horizontal threshold.

55. An apparatus for image enhancement for an interlaced display, the apparatus comprising:
   means for receiving a first plurality of pixels aligned about an axis;
   means for detecting a second plurality of pixels within the first plurality of pixels, each pixel of the second plurality of pixels having a luma or chroma disparity between adjacent pixels less than a first threshold;
   means for determining whether each pixel within the second plurality of pixels is part of a line or edge through a comparison of luma or chroma disparities between neighboring pixels, the means for determining comprises:
      means for selecting a first pixel within the second plurality of pixels;
      means for defining a pixel window including a plurality of pixels within the second plurality of pixels, the pixel window having a length equal to the number of pixels within the pixel window, the pixel window including a middle portion, the first pixel positioned within the middle portion;

means for determining whether a vertical correlation within the pixel window exists for the first pixel;

means for determining whether a horizontal correlation within the pixel window exists for the first pixel when a vertical correlation exists for the first pixel;

means for determining whether a temporal correlation within the pixel window exists for the first pixel when a horizontal correlation exists for the first pixel; and means for indicating the first pixel is part of a line or edge when vertical correlation, horizontal correlation, and temporal correlation exist for the first pixel; and means for filtering each pixel determined to be part of a line or edge.

56. The apparatus as defined in claim 55, wherein the means for determining whether a temporal correlation within the pixel window exists for the first pixel further comprises:

means for buffering potential flicker lines or edges when horizontal correlation and vertical correlation exist, the potential lines or edges buffered for a predetermined number of frames;

means for comparing a current luma or chroma of the first pixel with a buffered luma or chroma of the first pixel; and means for indicating a temporal correlation exists when the difference between the current luma or chroma of the first pixel and the buffered luma or chroma of the first pixel is greater than a temporal threshold.

57. The apparatus as defined in claim 56, wherein the predetermined number of frames is selected to allow comparison of the current luma or chroma of a pixel with the luma or chroma of the pixel from a frame displayed at least two frames earlier.

58. The apparatus as defined in claim 56, wherein the current luma or chroma of the first pixel is compared with a buffered luma or chroma of the first pixel that was stored two frames previous to the current luma or chroma.

59. The apparatus as defined in claim 56, wherein the means for filtering exhibits a filter response and the means for filtering further comprises using relatively long filters for detected lines and edges having relatively high chroma such that each step of the filter response is smaller than a visual flicker threshold.

60. The apparatus as defined in claim 56, wherein the means for filtering exhibits a filter response and the means for filtering further comprises using relatively long filters for detected lines and edges having relatively large contrast such that each step of the filter response is smaller than a visual flicker threshold.

61. The apparatus as defined in claim 56, wherein the length of the pixel window is directly related to a viewing distance.

62. The apparatus as defined in claim 56, wherein the length of the pixel window is selected to maintain a viewing angle.

63. The apparatus as defined in claim 62, wherein:

the viewing angle comprises the angle between an endpoint of a pixel window and a viewing position; and the viewing angle is about 1.5.

64. The apparatus as defined in claim 56, wherein the length of the pixel window is directly related to the number of pixels scanned within a time period.

65. The apparatus as defined in claim 64, wherein the length of the pixel window is equal to the number of pixels scanned within one microsecond.

66. The apparatus as defined in claim 56, further comprising:

means for scaling the image to create a second image having a resolution about equal to a display resolution before performing the image enhancement; and means for performing the image enhancement on the second image.

67. The apparatus as defined in claim 55, wherein the means for determining whether a horizontal correlation within the pixel window exists for the first pixel comprises:

means for summing the absolute values of the differences in luma or chroma between all adjacent pixels in the pixel window to create a cumulative horizontal disparity; and means for indicating horizontal correlation exists when the sum is less than a horizontal threshold.

68. The apparatus as defined in claim 55, wherein the means for determining whether a vertical correlation within the pixel window exists for the first pixel comprises:

means for calculating the absolute value of the sum of the differences between each pixel in the pixel window and the pixel above it to create a first sum;

means for calculating the absolute value of the sum of the differences between each pixel in the pixel window and the pixel below it to create a second sum;

means for indicating vertical correlation does not exist when the differences in luma or chroma between any pixel in the pixel window and the pixels above and below it are both zero;

means for indicating vertical correlation does not exist when either of the first sum or the second sum is greater than a vertical threshold; and means for indicating vertical correlation does not exist when the both the first sum and the second sum are less than or equal to the vertical threshold.

* * * * *